W. E. PORTER.
DEMAND APPARATUS.
APPLICATION FILED MAR. 18, 1913.
1,169,508.
Patented Jan. 25, 1916.
2 SHEETS—SHEET 1.
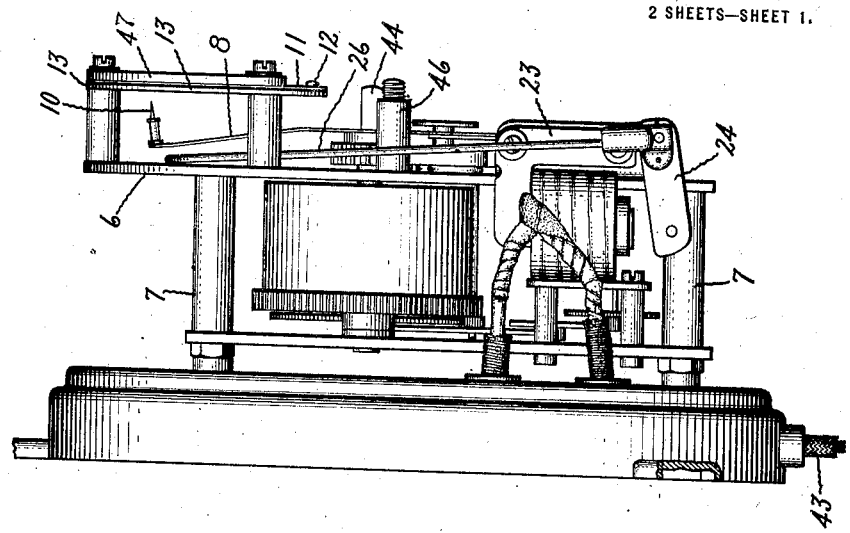
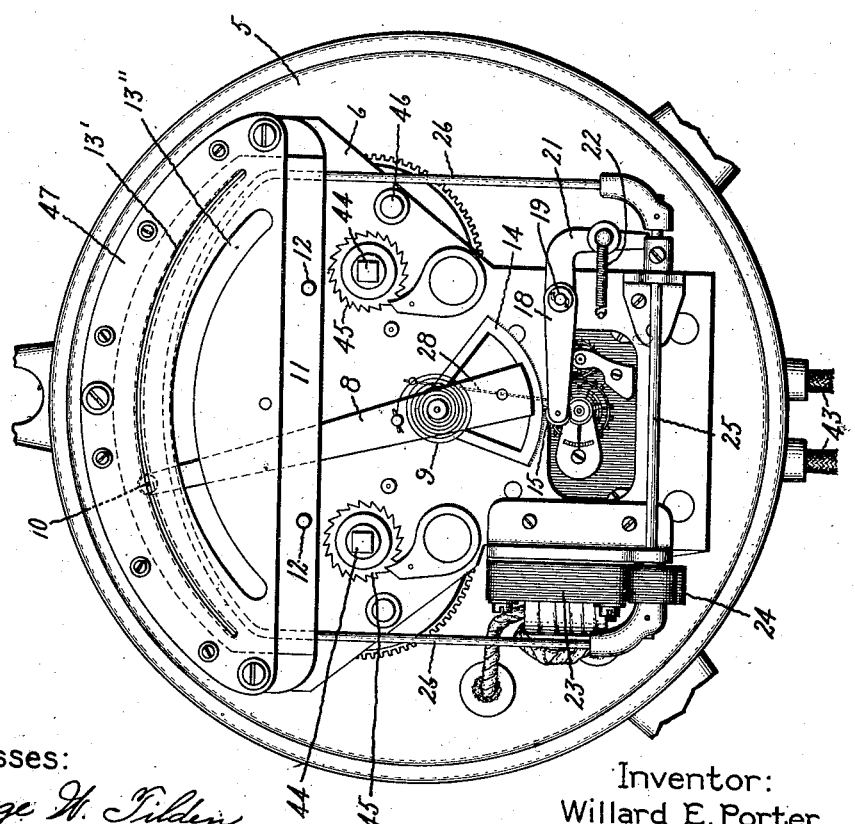
Witnesses:
George W. Tilden
J. Ellis Glen
Inventor:
Willard E. Porter,
by Albert E. Davis
His Attorney.

W. E. PORTER.
DEMAND APPARATUS.
APPLICATION FILED MAR. 18, 1913.
1,169,508.
Patented Jan. 25, 1916.
2 SHEETS—SHEET 2.
Fig. 3.
Fig. 4.
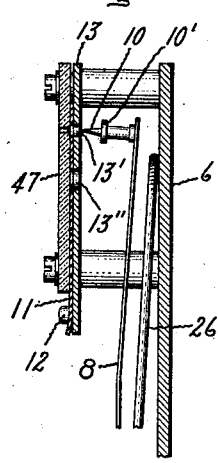
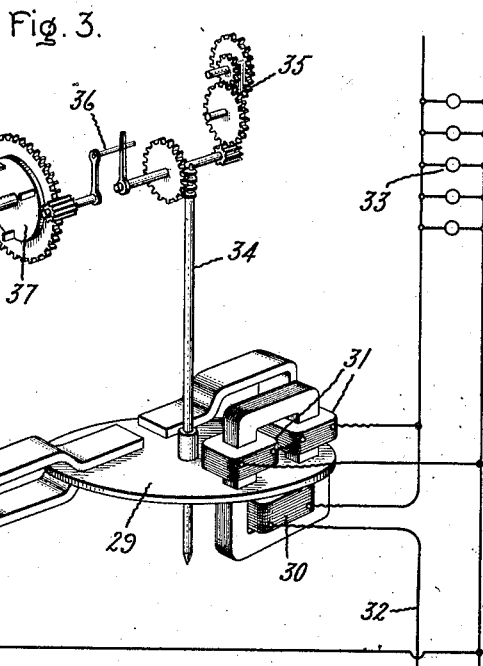
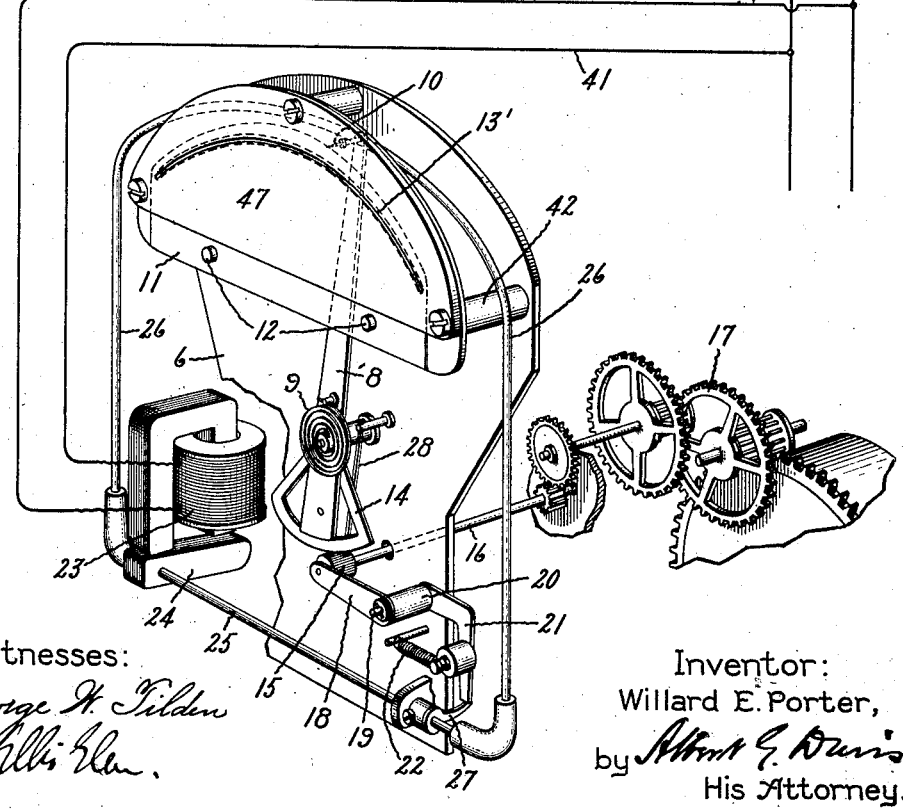
Witnesses:
George H. Tilden
J. Ellis Glen.
Inventor:
Willard E. Porter,
by Albert G. Davis
His Attorney.

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

DEMAND APPARATUS.

1,169,508.  Specification of Letters Patent.  Patented Jan. 25, 1916.

Application filed March 18, 1913. Serial No. 755,135.

*To all whom it may concern:*

Be it known that I, WILLARD E. PORTER, a citizen of the United States, residing at Lynn, in the county of Essex, State of Massachusetts, have invented certain new and useful Improvements in Demand Apparatus, of which the following is a specification.

My invention relates to apparatus for recording the character and magnitude of the demand made by an electrical installation upon a central generating station, or other source of electric energy.

More particularly my invention relates to a demand apparatus of the type disclosed in the application for patent of Lewis T. Robinson and John T. Dempster, Serial No. 755,196, filed March 18, 1913.

The object of my invention is to provide a demand instrument of simple construction and particularly adapted for practical and existing operating conditions.

My invention is particularly adapted to be embodied in a demand instrument for use in the type of apparatus described in the above identified application, and it is in conjunction with this type of apparatus that I have described my invention for the purpose of illustration.

The novel features which I believe to be characteristic of my invention are definitely indicated in the claims appended hereto.

The features of construction and mode of operation of a demand apparatus embodying a preferred form of my invention will be understood from the following description taken in connection with the accompanying drawings, in which—

Figure 1 is a front elevation, with the cover removed, of a demand instrument embodying the novel features of my invention; Fig. 2 is an end elevation of the same instrument; Fig. 3 is a diagrammatic view in perspective of my improved instrument operatively connected to an electrical installation; and Fig. 4 is a detail view of certain features of construction.

As previously suggested my novel and improved demand instrument is particularly adapted to be employed in an apparatus for recording on a suitable record sheet the times in which equal quantities of energy are metered. In such an apparatus the unit of reference is the equal quantity or interval of metered energy. Briefly, my improved instrument comprises a movable element arranged to be moved across a suitable record sheet by direct connection to a substantially constant speed driving mechanism, with means for interrupting the operative connection of the element and the mechanism at equal intervals of metered energy and for recording the position of the element on the record sheet, and for then returning the element to an initial position before the element and the mechanism are again operatively connected.

The operative elements of my improved demand instrument are mounted upon a circular supporting base 5. A supporting member 6 is secured to and suitably spaced from the base 5 by means of bolts 7. A movable element 8 is pivoted to the supporting member 6 and is controlled by a spring 9 which normally tends to return the element to an initial or zero position. I have shown the movable element 8 in the form of a pointer, but it will be understood that this showing is merely for the purpose of illustration since the element 8 may assume any desired configuration.

One end of the movable element 8 is provided with a pin point 10 arranged to sweep across and behind, as viewed from the front of the instrument, a suitable record sheet 11. The record sheet preferably consists of a semi-circular piece of paper having two apertures adapted to coincide with guide pins or projections 12. The pins 12 project from a plate 13 secured to and suitably spaced from the supporting member 6. I do not desire to limit my invention to use with the particular form of record sheet here described. It will be understood that a record sheet of any character upon which a suitable record may be made will answer satisfactorily, and I have accordingly employed the phrase record sheet in the appended claims in this broad sense.

The plate 13 has a curved slot 13' which coincides with the path of travel of the pin point 10 on the movable element 8. In Figs. 1 and 4 of the drawings I have shown a second curved slot 13'' in the plate 13. The purpose of this slot is to provide a view of the element 8 so that its movement can be conveniently observed. The record sheet is provided with a slot which coincides with the slot 13''. It will be understood that the slot 13'' is not necessary but is desirable under certain circumstances.

A plate 47, preferably of transparent material such as glass or celluloid, is secured to the plate 13 and these plates are so spaced apart as to permit the insertion of the record sheet between them. The plates 13 and 47 thus form a frame member for the record sheet, and the pins 12 determine the proper position of the record sheet in the frame and insure accuracy in the positioning of these sheets when renewals are made. The plate 47 has a curved slot registering with the slot 13 so that the pin point can make a suitable prick mark in the record sheet. The extent of penetration of the pin point into the record sheet is limited by the shoulder 10′ which engages the plate 13, and thus also serves to prevent a wedging engagement of the pin point in the slot 13′.

A gear member 14 is rigidly secured to the movable element 8. I prefer to employ a sector shaped gear as the gear member 14 since it possesses peculiar advantages more fully pointed out hereinafter. A driving pinion 15 is arranged to operatively engage with the sector shaped gear and to this end the pinion is mounted on a flexibly mounted shaft 16. The flexibly mounted shaft is driven at substantially constant speed by any suitable means, as for example, a clockwork mechanism 17. While I have shown a clockwork mechanism as the substantially constant speed driving means, it will be understood that any other suitable form of driving means, such as a constant speed electric motor, may be employed. The driving mechanism 17 operates to rotate the pinion 15 in a clockwise direction and the element 8 is, through the coöperative engagement of the pinion with the sector shaped gear 14, turned about its pivot in a counter-clockwise direction.

The pinion end of the flexibly mounted shaft 16 is connected to an arm 18 pivoted on a relatively fixed shaft 19 rigidly secured to the supporting member 6. A sleeve 20 is mounted on the shaft 19 and is rigidly secured at one end to the arm 18 and at the other end to an L-shaped arm 21. A tension spring 22 is secured at one end to a fixed part of the supporting member 6 and at the other end to the L-shaped arm 21. The spring 22 thus serves to normally maintain the driving pinion 15 in operative engagement with the sector shaped gear 14, by which engagement the element 8 is moved in a counter-clockwise direction across the record sheet 11.

An electromagnet 23 is mounted on the supporting base 5 and is provided with a pivoted armature 24. A frame-work comprising a bar 25 and a bail member 26 is rigidly secured to the armature 24 so that the movement of the latter will turn the bar 25 and the bail member 26 through a slight angle. A finger 27 rigidly secured to the bar 25 is arranged to engage with the L-shaped arm 21 when the bar 25 is turned by the movement of the armature 24.

It will be evident from the drawings that the movement of the armature 24 upon the energization of the electromagnet 23 operates to turn the bar 25 through a small angle and thus the arm 18 is turned about its pivot 19 through the engagement and coöperation of the finger 27 and L-shaped arm 21. The pinion 15 is thereby disengaged from operative connection with the sector shaped gear 14.

A thin leaf spring 28 is secured at one end to the supporting member 6 and its other end is adapted, under normal conditions, to lightly engage the surface of the pinion 15. The spring action of the leaf spring 28 tends to move the lower end of the spring from the right toward the left, that is, in a clockwise direction. Therefore, when the pinion 15 is lowered and withdrawn from engagement with the sector shaped gear 14 the leaf spring 28 will move through a very small angle in a clockwise direction and engage with one of the teeth of the pinion 15. The continued rotation of the pinion 15 in a clockwise direction will carry the leaf spring 28 back to its original position, but in the meantime the spring 28 holds the pinion 15 out of operative engagement with the sector shaped gear 14. The leaf spring 28 thus serves to provide a definite time interval for the disengaged condition of the pinion and sector shaped gear, the purpose of which will be more particularly referred to hereinafter.

In Fig. 3 of the drawings, I have shown my demand instrument in combination with an induction meter and operatively connected to an electrical installation. The induction meter comprises the usual rotatable disk armature 29 situated within the influence of a rotating field produced in the well known manner by the series coil 30 and the potential coils 31. These coils are appropriately connected to the main line circuit 32 which supplies energy to translating devices 33. A rotatable shaft 34 is rigidly secured to the disk armature 29 and serves to drive through gearing 35 the recording mechanism of the meter which is not shown in the drawings. The meter shaft 34 also drives through the connection 36 a metallic contact disk 37 provided with three contacts which are adapted to engage with a fixed flexible contact 38. The contact disk 37 is connected by conductor 39 to one side of the line circuit 32 and the fixed contact 38 is connected by conductor 40 to one terminal of the winding of electromagnet 23, and the other terminal of the winding of electromagnet 23 is connected to the other conductor of the line circuit 32 by lead 41.

The terminals 43 shown in Figs. 1 and 2 are connected to the winding of the electromagnet 23. The clock-work mechanism is wound by means of the key shafts 44 which are associated with the usual pawl and ratchet devices 45. The operative elements of the instrument are adapted to be inclosed by a suitable cover, an illustration of which has been omitted in the drawings in order to simplify the showing of the internal construction of the instrument. Posts 46, each having a screw thread at one end, have, however, been illustrated as a means of securing a suitable cover to the supporting base 5.

The operation of my improved demand instrument is as follows: The spring 22 normally maintains the driving pinion 15 in operative engagement with the sector shaped gear 14. The movement of the time actuated or constant speed mechanism 17 is thus transmitted to the element 8 and the latter is moved at a uniform speed in a counter-clockwise direction across the record sheet 11. It will be noted by reference to Fig. 4 of the drawings that the element 8 moves behind the record sheet, as viewed from the front of the instrument.

When a predetermined quantity of energy has been metered, that is, when the shaft 34 has made a predetermined number of revolutions, one of the contacts of the contact disk 37 engages with the fixed contact 38 and thereby the electromagnet 23 is energized. The movement of the armature 24, upon the energization of the electro-magnet 23, turns the rod 25 and the bail member 26 through small angles. The angular movement of the bar 25 interrupts the operative engagement of the pinion 15 with the sector shaped gear 14 through the coöperation of the finger 27 and the L-shaped arm 21. The free end of the leaf spring 28 moves slightly in a clockwise direction and engages in one of the teeth of the pinion 15, and thus tends to hold the pinion in its lowered position and disconnected from its engagement with the sector shaped gear 14.

The curved upper portion of the bail member 26 normally rests against the supporting member 6. This position is maintained by the weight of the armature 24, as will be readily seen from Fig. 2. The element 8 is constructed of elastic material and normally occupies a position about midway between the supporting member 6 and the plate 13. When the electromagnet 23 is energized the armature 24 is attracted, or pulled up as viewed in Fig. 2, and the bail member 26 is given an angular movement. This angular movement of the bail member 26 causes its curved upper portion to contact with the element 8 and to force the pin point 10 into the record sheet 11. The bail member will hold the pin point in this position until the electromagnet 23 is deënergized, whereupon the bail member is moved back to its normal position by the weight of the armature 24. The curved upper portion of the bail member is so shaped that its action upon the element 8 is effective at any position of the element on the record sheet.

The pin point 10, due to the elastic characteristics of the element 8, withdraws from the record sheet 11 when the bail member moves back to its normal position. The element 8 now being free to move, is returned to its initial or zero position by means of the control spring 9; the initial position of the element being determined by its engagement with a fixed stop 42.

As previously mentioned, the free end of the leaf spring 28 moves into engagement with the pinion 15 as soon as the latter is moved about its pivot shaft 19. The leaf spring tends to hold the pinion in its lowered position, but the continued revolution of the pinion in a clockwise direction carries the free end of the spring toward the right, and the pinion gradually rises until it finally engages with the sector shaped gear 14 and the leaf spring occupies its normal operating position, bearing lightly against the surface of the pinion. The function of the leaf spring 28 is thus to provide a definite time interval for the disengagement of the pinion 15 and the sector shaped gear 14, so as to allow the element 8 sufficient time to return to its initial or zero position, after impressing a prick mark in the record sheet to record its position at the end of the interval of metered energy.

It will be evident from the foregoing description that the pin point 10 on the element 8 makes an impression on the record sheet at equal intervals of metered energy. The record sheets 11 are of standard shape and are adapted to be removed from the instrument for the purpose of examination by disengaging the record sheet from the pins 12 and withdrawing the sheet from the frame member. The prick marks made in the record sheet by the pin point 10 thus give a permanent record of the lengths of time in which equal quantities of energy were metered. The prick marks at the right hand end of the record sheet, as determined by its position in the frame member, will indicate the abnormally large demands made by the consumer's installation and will also show with approximate and sufficient accuracy for practical purposes the frequency of occurrence and the magnitude of these abnormal demands.

While I have illustrated a sector shaped gear secured to the movable element 8, it will be understood that this is merely the form of driving instrumentality which I prefer to employ. The sector shaped gear is peculiarly adapted for use in the connection illustrated since the length of the toothed surface of the sector can be proportioned to move the element 8 only through an angle corresponding to the width of the record sheet. If, therefore, the element is carried to the extreme left hand end of the record sheet before the predetermined interval of energy is metered, it will remain stationary at this end of the instrument since there is in this position no coöperative driving engagement between the pinion and the sector shaped gear.

While I have specifically described a gear connection between the driving mechanism and the movable element, it will be understood that this is merely for the purpose of illustration, since any other equivalent operative connection between these parts is within the scope of my invention; the important feature of my invention in this regard being that the driving mechanism is arranged for direct connection to the movable element without the intervention of intermediate instrumentalities. This feature greatly simplifies the construction of the instrument.

The position of the frame member and record sheet in front of the movable element is of decided advantage and constitutes one of the valuable features of my invention. By such a construction, the record sheet is placed in the front part of the instrument so that all operative parts are behind the sheet. This permits the removal of the record sheets without danger to the operative parts of the instrument, and also without in any way interfering with the operation of the instrument. It will be further noted that the construction is such that all the operative parts of the instrument may be incased and at the same time a convenient and easy renewal of the record sheets is permitted.

It will be seen from the foregoing description and the accompanying drawings that I have provided a simple and reliable instrument for recording the times in which equal quantities of energy are metered. The prick mark nearest the right hand end of the record sheet will provide an indication of the minimum time in which any one of the equal intervals of energy are metered. Obviously, this prick mark is also an indication of the maximum rate of consumption of energy. The instrument, however, not only gives an indication of this one maximum demand, but also records with approximate and entirely satisfactory accuracy the number of times that abnormal conditions in energy consumption exist in the electrical installation.

It will be apparent to those skilled in the art that numerous modifications and changes may be made in the detail of construction of the improved demand instrument which I have herein illustrated and described without departing from the spirit of my invention. I have accordingly aimed in the appended claims to cover all modifications which are within the scope of my invention.

What I claim as new and desire to secure by Letters Patent of the United States, is:—

1. A demand instrument comprising a movable element, a gear member secured to said element, a pinion arranged to normally engage with said gear member, means for driving said pinion, means for interrupting the operative engagement of said pinion with said gear member at intervals, means for returning said element to an initial position at the end of each interval, and a spring member coöperating with said pinion and arranged to maintain the pinion and the gear member disengaged until the element has returned to its initial position.

2. A demand instrument comprising a movable element, a driving mechanism operatively arranged to normally move said element, means for interrupting the operative arrangement of said driving mechanism and said element at intervals, means for returning said element to an initial position when the operative arrangement of the driving mechanism and the element is interrupted, and a spring member arranged to hold said driving mechanism and said element in inoperative relation until the element has returned to its initial position.

3. A demand instrument comprising a movable element, a recording means on said element, a sector shaped gear secured to said element, a pinion arranged to operatively engage with said sector shaped gear, means for driving said pinion, an electromagnet having a movable armature, a framework secured to said armature and operatively related to said element and said pinion whereby a movement of said armature causes said recording means to make a record mark on a suitable record sheet and interrupts the operative engagement of said pinion with said sector shaped gear, means for returning the element to an initial position after the recording means has made the record mark on the record sheet, and a spring member adapted to press lightly against said pinion and arranged to maintain the pinion and the sector shaped gear disengaged until the element has returned to its initial position.

4. The combination with an electric meter of a demand instrument comprising a movable element, a gear member operatively related to said element, a driving member arranged to operatively engage with said gear member, means for driving said driving member at substantially constant speed, means tending to return said element to an initial position, means for interrupting the operative engagement of said driving member and said gear member at equal intervals of metered energy, a spring member lightly engaging said driving member and arranged to hold said driving member out of operative engagement with said gear member for a definite time interval when the operative engagement between the driving member and the gear member is interrupted, and means for recording the extent of movement of said element during each of a number of equal intervals of metered energy.

5. A demand instrument comprising a movable element, a driving member arranged to operatively engage said element, means for driving said driving member, means for interrupting the operative engagement between said element and said driving member at intervals, means tending to return said element to an initial position when the operative engagement between the element and the driving member is interrupted, and a spring member lightly engaging said driving member and arranged to hold said driving member out of operative engagement with said element while the element is returning to its initial position.

In witness whereof, I have hereunto set my hand this sixth day of March, 1913.

WILLARD E. PORTER.

Witnesses:
 JOHN A. MCMANUS, Jr.,
 FRANK G. HATTIE.